(12) United States Patent
Chen

(10) Patent No.: US 10,740,178 B2
(45) Date of Patent: Aug. 11, 2020

(54) SELF-PRIORITIZING ADAPTIVE RETRY THRESHOLD ADJUSTMENT

(71) Applicant: Western Digital Technologies, Inc., San Jose, CA (US)

(72) Inventor: Xiaoheng Chen, Dublin, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 176 days.

(21) Appl. No.: 16/140,192

(22) Filed: Sep. 24, 2018

(65) Prior Publication Data

US 2019/0108091 A1     Apr. 11, 2019

Related U.S. Application Data

(60) Provisional application No. 62/568,729, filed on Oct. 5, 2017.

(51) Int. Cl.
  *G06F 11/00* (2006.01)
  *G06F 11/10* (2006.01)
  *G06F 11/14* (2006.01)

(52) U.S. Cl.
  CPC ........ *G06F 11/1068* (2013.01); *G06F 11/141* (2013.01); *G06F 11/1435* (2013.01); *G06F 11/1471* (2013.01)

(58) Field of Classification Search
  CPC ............... G06F 11/1068; G06F 11/141; G06F 11/1435; G06F 11/1471
  See application file for complete search history.

(56) References Cited

U.S. PATENT DOCUMENTS

| | | | |
|---|---|---|---|
| 9,633,740 B1* | 4/2017 | Alhussien | G11C 16/28 |
| 9,773,565 B1* | 9/2017 | Yeh | G11C 16/26 |
| 2017/0236592 A1* | 8/2017 | Alhussien | G11C 16/3431 |
| | | | 714/721 |
| 2018/0046527 A1* | 2/2018 | Reusswig | G06F 11/004 |
| 2018/0197619 A1* | 7/2018 | Chen | G11C 29/028 |
| 2018/0342305 A1* | 11/2018 | Cha | G11C 16/26 |
| 2019/0361778 A1* | 11/2019 | Kim | G06F 11/1048 |

* cited by examiner

*Primary Examiner* — Katherine Lin
(74) *Attorney, Agent, or Firm* — Loza & Loza, LLP; Gabriel Fitch

(57) ABSTRACT

Exemplary methods and apparatus are provided for read recovery in solid state devices (SSDs) with non-volatile memories (NVMs). In some examples, a dynamic priority read retry table (PRT) is generated for use with a static read retry table (RRT). In one aspect, a most recent successful read retry entry is determined from among the entries in the RRT. The most recent successful read retry entry is inserted as a first priority read retry entry within the PRT. A subsequent read recovery operation is performed using the first priority read retry entry of the PRT. In some examples, one or more neighboring values are selected for each entry in the PRT starting with the newest entry and proceeding chronologically to the oldest entry. The use of the PRT may help address die-to-die variations, block-to-block variations, or the transient changes that may occur in device physics within NVMs.

20 Claims, 9 Drawing Sheets

Lower Page Read Mode 1 Retry Table (202)

| ID | BR |
|----|----|
| 0  | 0  |
| 1  | -8 |
| 2  | 4  |
| 3  | -4 |

Lower Page Read Mode 2 Retry Table

| ID | BR |
|----|----|
| 0  | 0  |
| 1  | -4 |
| 2  | 4  |
| 3  | -8 |
| 4  | 8  |

Upper Page Read Mode 1 Retry Table (204)

| ID | AR, CR |
|----|--------|
| 0  | 0, 0   |
| 1  | -32, -4 |
| 2  | 12, 0  |
| 3  | 8, -4  |
| ... | ...   |
| 22 | -32, 0 |

Upper Page Read Mode 2 Retry Table

| ID | AR, CR |
|----|--------|
| 0  | 0, 0   |
| 1  | -12, -4 |
| 2  | -24, -8 |
| 3  | 4, 0   |
| ... | ...   |
| 22 | -16, -8 |

FIG. 2

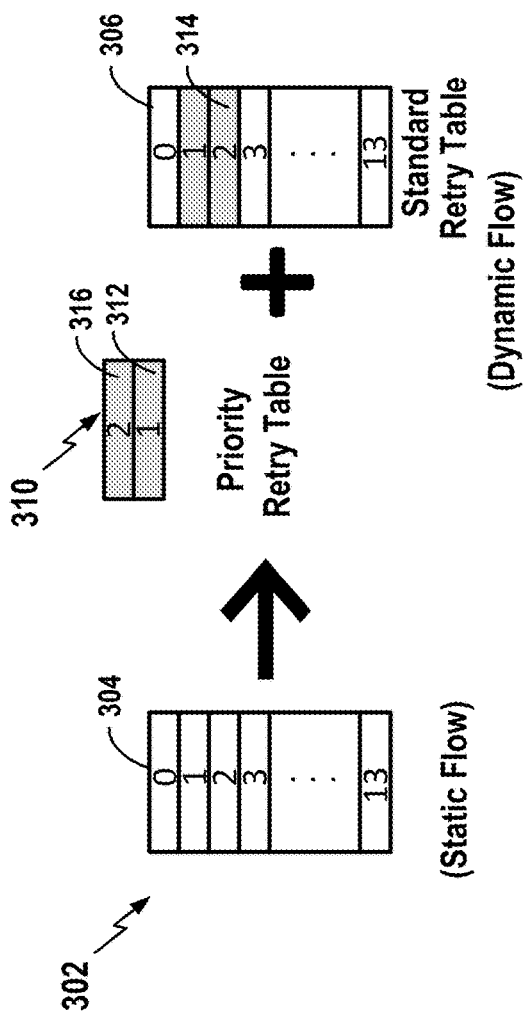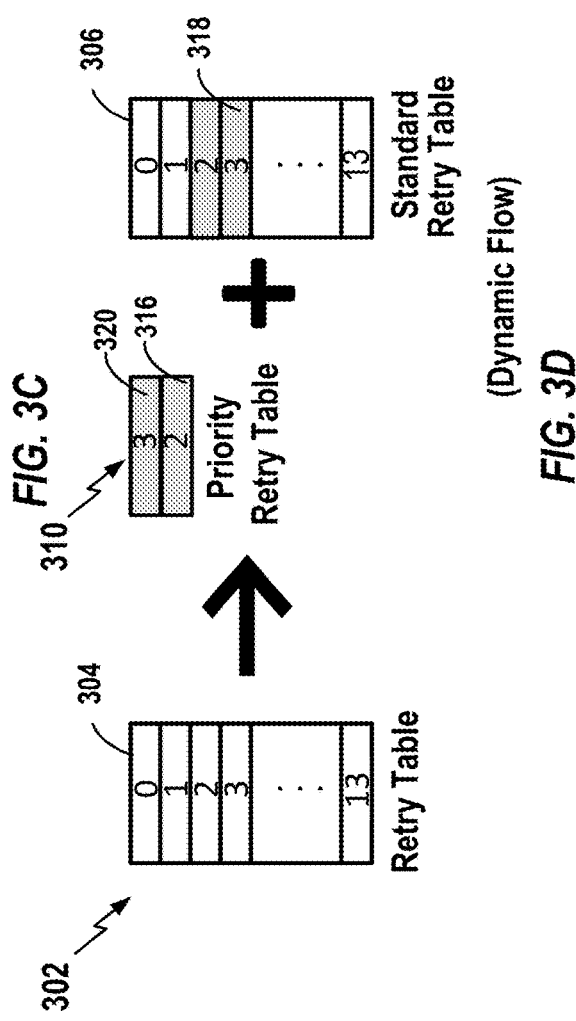
FIG. 3C
FIG. 3D

US 10,740,178 B2

SELF-PRIORITIZING ADAPTIVE RETRY THRESHOLD ADJUSTMENT

CLAIM OF PRIORITY UNDER 35 U.S.C. § 119

The present Application for Patent claims priority to Provisional Application No. 62/568,729, entitled "METHODS AND APPARATUS FOR SELF-PRIORITIZING ADAPTIVE RETRY THRESHOLD ADJUSTMENT," filed Oct. 5, 2017, which is assigned to the assignee hereof and hereby expressly incorporated by reference herein.

FIELD

The disclosure relates, in some embodiments, to data storage devices, such as solid state devices (SSD) that employ controllers to access non-volatile memory arrays. More specifically, but not exclusively, the disclosure relates to methods and apparatus for self-prioritizing adaptive retry threshold adjustments for read retry in SSD devices.

INTRODUCTION

In a variety of consumer electronics, solid state devices (SSDs) incorporating non-volatile memories (NVMs) are replacing or supplementing conventional rotating hard disk drives for mass storage. These non-volatile memories may include one or more flash memory devices, such as NAND flash memories. Due to high error rates that can occur when reading data from NAND flash memories, error correction procedures (e.g., error correction codes and algorithms) and read retry operations may be utilized to improve SSD reliability and data integrity. Advanced error correction codes, such as low-density parity-check (LDPC) codes, are powerful and capable of correcting many bit errors. However, proper read retry levels also play a significant role in bit error rate (BER) reduction and for determining the effectiveness and Quality of Service (QoS) of read recovery. A static read retry table is often employed based on the characterized NAND data.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides an apparatus that includes: a physical memory array; and a processor configured to perform a read recovery operation within the physical memory array using entries in a read retry table, determine a most recent successful read retry entry from among the entries in the read retry table, generate a separate priority read retry table, and insert the most recent successful read retry entry as a first priority entry in the priority read retry table for use during a subsequent read recovery operation.

Another embodiment of the disclosure provides a method for use with a physical memory array, where the method includes: generating a read retry table having a set order; generating a priority read retry table; determining a most recent successful read retry entry from among the entries in the read retry table for a first read recovery operation on the physical memory; setting the most recent successful read retry entry as a first priority read retry entry within the priority read retry table; and performing a second read recovery operation on the physical memory array using the first priority read retry entry of the priority read retry table.

Yet another embodiment of the disclosure provides an apparatus that includes: means for generating a priority read retry table of read retry entries based on read retry entries obtained from a separate read retry table; means for determining a most recent successful read retry entry from the separate read retry table; and means for populating the priority read retry table by inserting an entry from the read retry table into the priority read retry table, wherein the entry corresponds to the most recent successful read recovery and is inserted as a first priority entry in the priority read retry table.

BRIEF DESCRIPTION OF THE DRAWINGS

FIG. 2 illustrates an example of a static read retry table for use in an SSD.

FIGS. 3A-3D illustrate the generation of a dynamic priority read retry table for the use with a static retry table in accordance with aspects of the present disclosure.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The main examples herein relate to data storage devices or data storage apparatus for use with host devices, where the device or apparatus may be a solid state device (SSD) such as a solid state drive. In many examples, the SSD includes a non-volatile memory (NVM) array, which is one example of a physical memory array.

As noted above, proper read retry levels play a significant role in bit error rate (BER) reduction and for determining the effectiveness and Quality of Service (QoS) of read recovery. A static read retry table is often employed based on the characterized NAND data. Often, however, the ordering of the read retry table is not optimized to address die-to-die variation, block-to-block variation, or the transient changes that may occur in device physics.

The methods and apparatus described herein provide for dynamically adjusting the order of read retry entries in a read retry table to, e.g., reduce the read retry latency.

Figure 1:
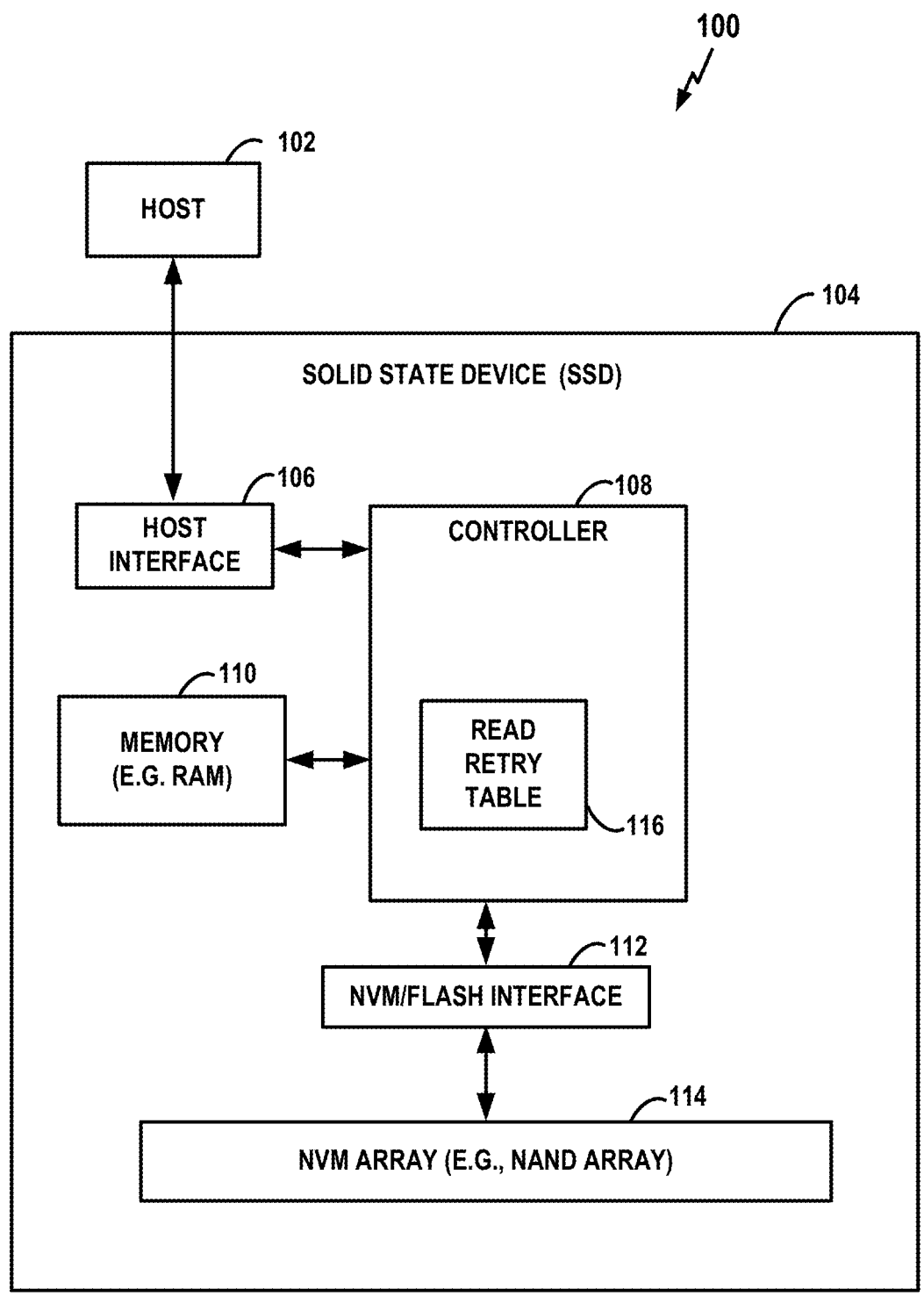
FIG. 1 shows a schematic block diagram configuration for an exemplary solid state device (SSD) having one or more non-volatile memory (NVM) arrays.

FIG. 1 is a block diagram of a system 100 including an exemplary SSD in which self-prioritizing adaptive retry threshold adjustment (herein, "SPARTA") for read retry may be implemented in accordance with aspects of the disclosure. The system 100 includes a host 102 and a SSD 104 coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, or a digital phone as merely a few examples.

The SSD 104 includes a host interface 106, a controller 108 (or alternatively, an NVM controller 108), which also includes a memory 110 (such as a random access memory (RAM)), an NVM interface 112 (which may also be referred to as a Flash memory interface), and an NVM 114, such as a NAND Flash memory, for example. The host interface 106 is coupled to the controller 108 and facilitates communication between the host 102 and the controller 108. Additionally, the controller 108 is coupled to the memory 110 as well as the NVM 114 via the NVM interface 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

The controller 108 controls operation of the SSD 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any suitable memory, computing device, or system capable of storing data. For example, the memory 110 may be ordinary RAM, dynamic RAM (DRAM), double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory.

The NVM 114 receives data from the controller 108 via the NVM interface 112 and stores the data. The NVM 114 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage array, or the like.

In the example of FIG. 1, the controller 108 may also include hardware, firmware, software, or any combinations thereof that implement read retry, as will be discussed herein. The read retry algorithms or procedures may include the use of at least one read retry table 116 that is used for ordering of read retry. Although illustrated within controller 108, the read retry table 116 may be implemented and/or stored within memory 110, the NAND array 114, or even within the host 102. Read recovery flow is often used in SSDs when there is a read error. For example, a high bit error rate (BER) from the read sensing causes the decoding failure of error correction codes (ECCs). An additionally utilized read retry allows a NAND controller (such as controller 108) to repeatedly perform a read operation while changing or adjusting a level of a read voltage according to the read voltages listed on the read retry table until the read operation on a selected page is passed (i.e., successful ECC decoding occurs). Read level adjustment is an effective tool for finding a better or best read level for successful ECC decoding. The read retry often follows a static ordering of read retry entries. For example, when the logical page of a multi-level cell (MLC) device has a read failure, the read retry is a trial-and-error process starting from an indexed 0 in the table (e.g., 116) to the last entry of the retry table that is executed until successful decoding occurs.

FIG. 2 illustrates exemplary read retry tables for lower pages (i.e., those pages storing least significant bits LSBs) and upper pages (i.e., those pages storing most significant bits MSBs). In MLC NAND Flash coding, the lower page (LP) may be read by applying a read voltage level (denoted as "BR"), whereas the upper page (UP) may be read by applying a pair of read voltage levels (denoted "AR" and "CR"). The tables 202 represent read reply tables for the lower pages, for at least a couple modes concerning different read speeds (Read Mode 1 or Read Mode 2), respectively, where the read retry tables show application of a respective read voltage level BR in a sequential and fixed (i.e., static) order from ID number 0 through ID number 4 in this example. Similarly, for upper pages, read retry tables 204 show the application of various read voltage levels AR and CR in a static and sequential manner from ID number 0 to ID number 22 in this particular example. In some examples, Read Mode 1 is faster than Read Mode 2 (and hence at risk of more errors).

The static approach of FIG. 2 may lack the efficiency to improve the QoS of the drive read behavior. Read errors on the same block or die in the NAND array 114 often have a high degree of similarity due to the intrinsic characteristics of NAND memory. Accordingly, the most recently used read levels resulting in successful read recovery statistically have a much higher chance of success than the rest of the read retry table. The exemplary methods and apparatus described herein maintain a die-level (or block-group-level) small subset of the retry table (denoted herein as a priority retry table (PRT)). The PRT may be configured to have a maximum size of M where M<=N, with N being the size of the entire read retry table. The PRT is maintained by following the "most recently successful" rule and is maintained by entry recentness. That is, the read level values that yield successful decoding the most recent in time are the values maintained in the PRT. In this manner, the PRT is dynamically updated in time and is not a static table. In some examples, every valid entry in the PRT is unique with no repetition of ID values.

FIGS. 3A-3D illustrate the development or dynamic generation of a read retry table with the use of a dynamically updated PRT. In the example of FIGS. 3A-3D, the size M of the PRT is assumed to be M=2 for a retry table having a size N=14. These values are merely for purposes of illustration, and those skilled in the art will appreciate that the values of M and N may be either less than or greater than the values of the illustrated example.

Figure 3A:
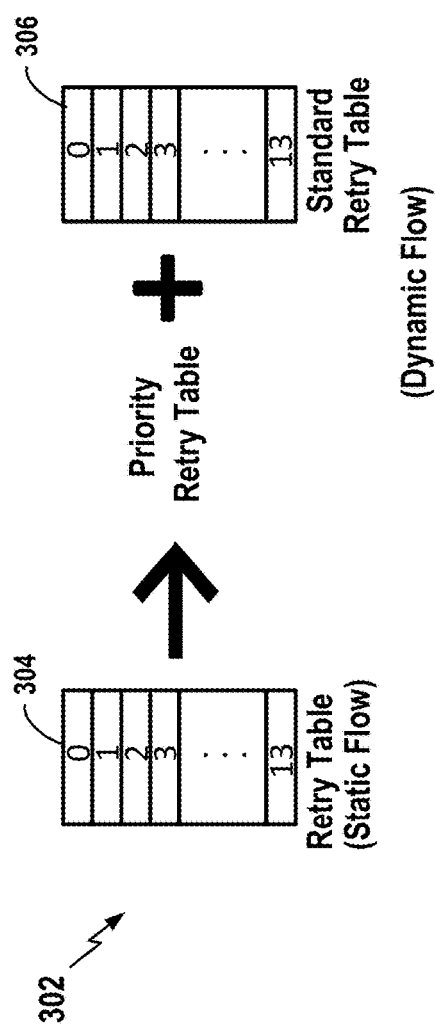

FIG. 3A illustrates a read retry table 302 during an initialization time period when the SSD is booted up, and the PRT is empty (and hence not shown) as no reads and decoding have not yet occurred. As shown in FIG. 3A, a standard read retry table 304 having 14 entries, indexes, or IDs is shown on the left. The modification of the table in accordance with aspects of the present disclosure is illustrated by the combination of a PRT (which is not shown in FIG. 3A, as no reads have occurred at this time period) and standard read retry table 306 (which is the same as table 302 and is shown for sake of comparison).

Figure 3B:
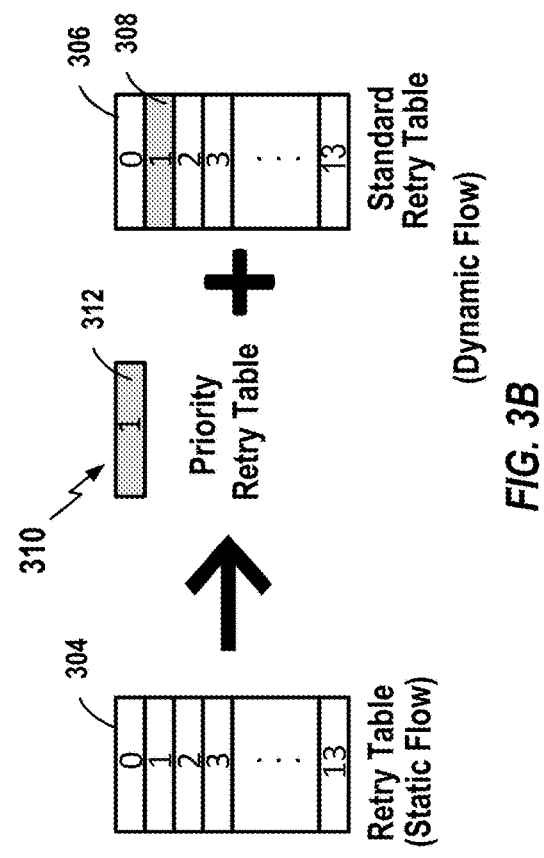

FIG. 3B illustrates the read retry table 302 after the initialization time period of FIG. 3A when the SSD is booted up, and a successful read retry has occurred. In the example of FIG. 3B, the entry indexed at 1, denoted 308 and shaded in table 306 (to highlight the entry), is shown to lead to a successful read entry and is therefore promoted to the PRT 310 as shown at entry 1, denoted 312 and also shaded.

FIG. 3C illustrates the read entry table 302 at a time subsequent to the time in FIG. 3B. Here an entry indexed at 2, denoted 314 and shaded for emphasis, is shown to have yielded a successful read retry and is promoted to the top of the PRT 308 as illustrated at entry 316. Note that the entry indexed at 1 (i.e., 312) is then the second entry in PRT 308 based on the "most recently successful" rule. Accordingly, future read recoveries then start or begin from entry indexed at "2" first (i.e., the now first entry 316 in PRT 308).

FIG. 3D illustrates the read entry table 302 at a next time subsequent to the time in FIG. 3C. Here, an entry indexed at 3, denoted 318 and shaded for emphasis, is shown to have yielded a successful read retry and is promoted to the top of the PRT 308 as illustrated at entry 320. Note that the entry indexed at 2 (i.e., 316) is then the second entry in PRT 308 based on the "most recently successful" rule. Accordingly, future read recoveries then start or begin from entry indexed at "3" first (i.e., the now first entry 320 in PRT 308). Of further note particular to this example, the entry indexed at 1 (i.e., 312) is evicted or deleted from the PRT 308 due to the capacity limitation of M=2 for PRT 308.

Figure 4:
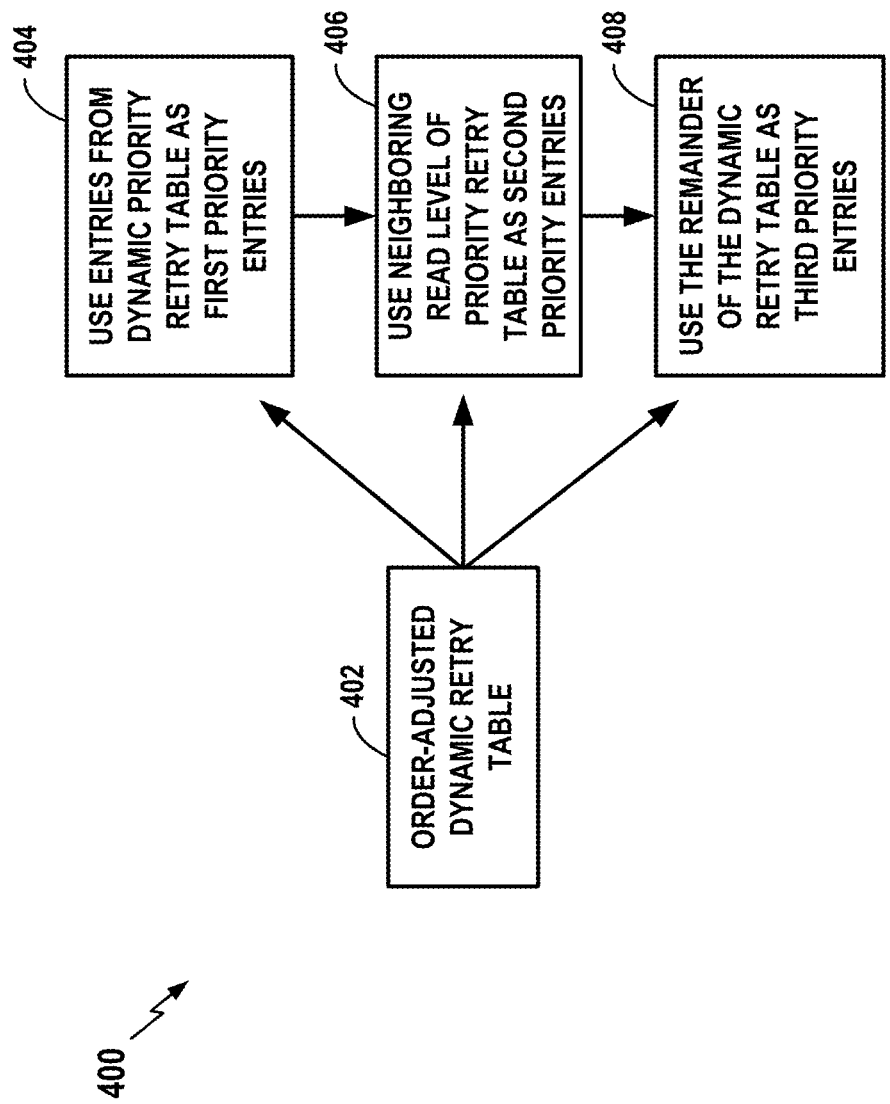
FIG. 4 illustrates an exemplary prioritization for the use of entries in a priority retry table and a read retry table in accordance with aspects of the present disclosure.

FIG. 4 illustrates the priority of entries in the PRT and read retry tables that are followed according to one example of the present methodology. As illustrated in the diagram 400 in FIG. 4, an order-adjusted dynamic retry table as indicated at block 402 is provided, of which the ordering is illustrated in sequential blocks 404, 406, and 408. Arrows are shown from the order-adjusted dynamic retry table 402 to the other blocks to indicate that information from the order-adjusted dynamic retry table 402 is used in the processing of the other blocks. In particular, during read recovery using the disclosed read entry table and the PRT, it will be appreciated from the above discussion, that the entries in the dynamic PRT (e.g., 308 of FIGS. 3A-3D) are the first priority entries used in the read retry table (which might also be referred to as a read recovery table), as indicated at block 404. That is, the first entry (i.e., the newest entry) in PRT 308 and its attendant BR or (AR, CR) values are selected first for attempting read recovery to decode the read.

Additionally, according to another aspect of FIG. 4, the "neighbors" of the entries in PRT are used as the second priority entries in read recovery, as indicated at block 406. In this context, the term "neighbors" means voltage values on either side of the values for a particular entry. In another aspect, the "neighbors" should also be a member of the existing retry table and must not co-exist in the PRT, as this would result, in at least some examples, in unwanted expansion of the retry table that could jeopardize the read latency. After the "neighbors" are tried for recovery, the remainder or the rest of the dynamic read retry table is utilized as third priority entries, as indicated at block 408, as these entries are considered less (or the least likely) to lead to a successful read recovery, but are nevertheless worth trying.

Figure 5:
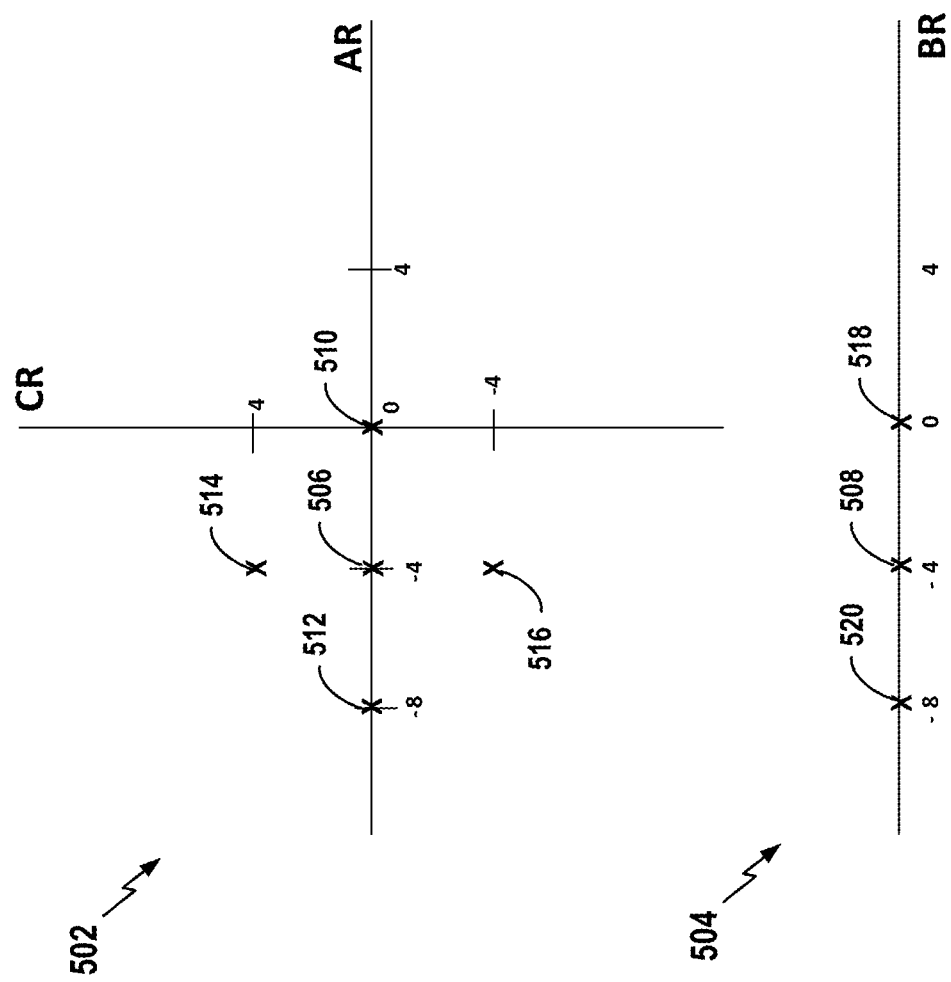
FIG. 5 further illustrates values on a Cartesian plane showing exemplary voltage values corresponding to neighboring entries referred to in FIG. 4.

FIG. 5 further illustrates values on a Cartesian plane showing voltage values that related to the "neighboring" entries discussed in connection with FIG. 4. In particular, FIG. 5 shows the example of a typical "neighbor" for both (AR, CR) upper page entries at 502 and (BR) lower page entries at 504. In the upper page example 502, the neighbors of the entry corresponding to voltage value 506 are the AR, CR values directly to the right, left, top, and bottom (indicated by reference numbers 510, 512, 514, and 516) by some unitized value (e.g., 4 in this example). Similarly, for lower page entries at shown at 504, the neighbors of the entry corresponding to voltage value 508 are the BR values directly to the right or left (indicated by reference numbers 518 and 520) by some unitized value (e.g., 4 in this example). In this example, each singular unit is 25 mV, so the value of (0, 4), for example means AR=0 mV and CR=100 mV. The units are merely exemplary, and the unitized or unit values may be determined to be a voltage value as desired. Furthermore, a "neighbor" could be defined as any entry whose Euclidean distance to the PRT entries is less than a predetermined threshold.

Figure 6:
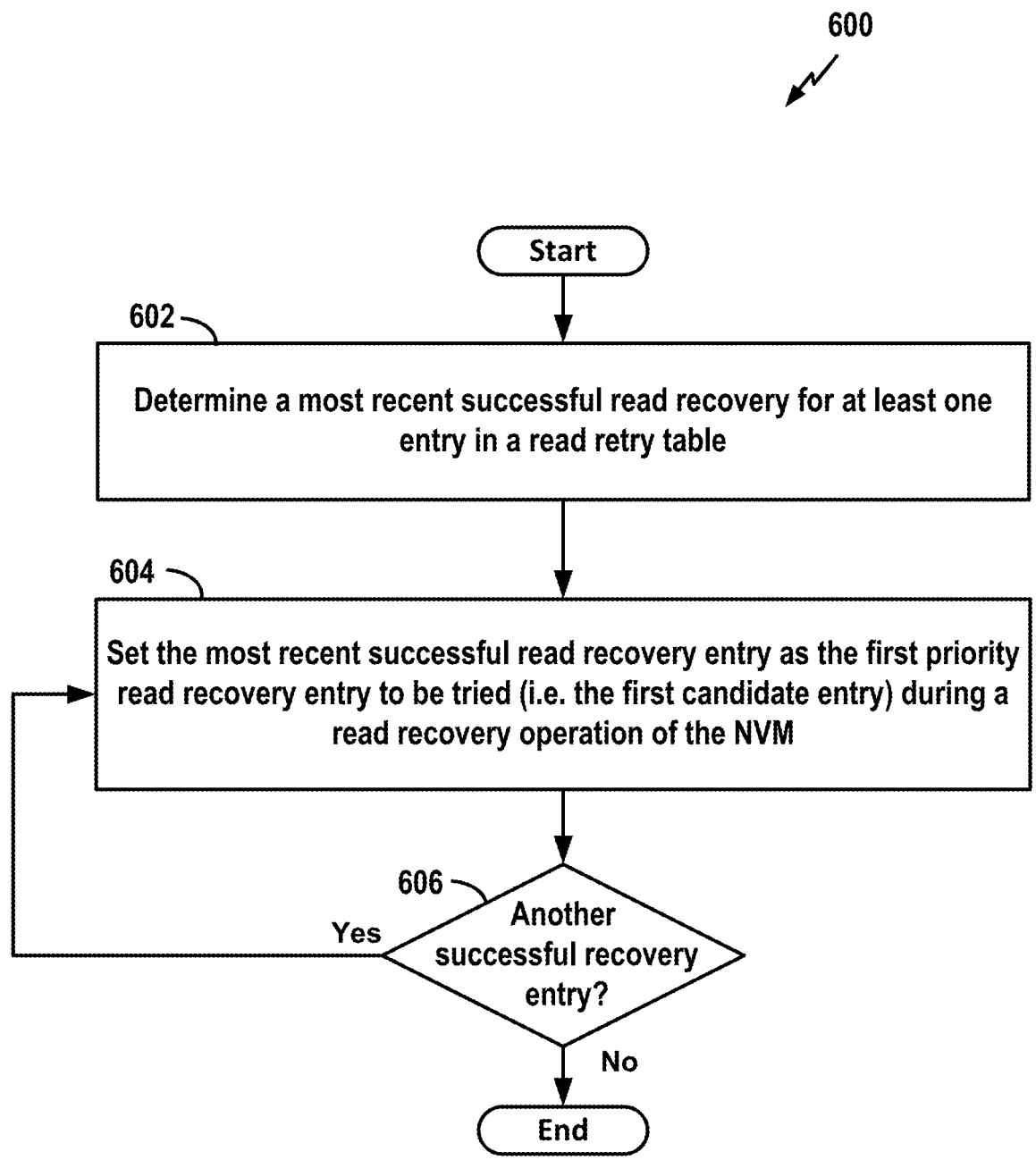
FIG. 6 illustrates a flow chart of an exemplary method according to aspects of the present disclosure.

FIG. 6 illustrates a flow chart of a method 600 according to aspects of the present disclosure. The method 600 is provided for operating an SSD including an NVM and includes generating a priority read retry table of read retry entries based on read retry entries in a read retry table having a set order (e.g., the PRT is based on the entries from the standard read retry table). The generation of the PRT includes determining a most recent successful read recovery for at least one entry in the read retry table as illustrated in block 602. Method 600 further includes setting the most recent successful read retry entry as the first priority read retry entry to be tried (i.e. the first candidate entry) during a read recovery operation of the NVM as illustrated in block 604. As was described above, for each current successful read entry, the entry is placed in the PRT as the first or top priority entry of the PRT. Thus, decision block 606 indicates for each instance where a successful retry occurs, the process of block 604 repeats to place the most recent successful decode entry as the top priority entry of the PRT. Of further note, although not illustrated in FIG. 6, if the size of the PRT is exceeded after entry of the most recent entry, the oldest entry in the PRT is deleted or evicted.

As will be appreciated by those skilled in the art, die-to-die, block-to-block, and/or wordline-to-wordline variations are often observed in SSD devices, for which a single set of retry table derived from a small set characterized data is most likely not optimized to handle. Therefore, long read retry can cause read performance and QoS drop and not have optimized performance. The methods and apparatus described herein that dynamically adapt the ordering of the read retry entries can lead to significant reduction in read latency, with an attendant improvement in the SSD drive read performance in the high error bit rate circumstances such as high temperature, end of drive life, etc.

In the following, various general exemplary procedures and systems are described.

Example Process or Procedure

Figure 7:
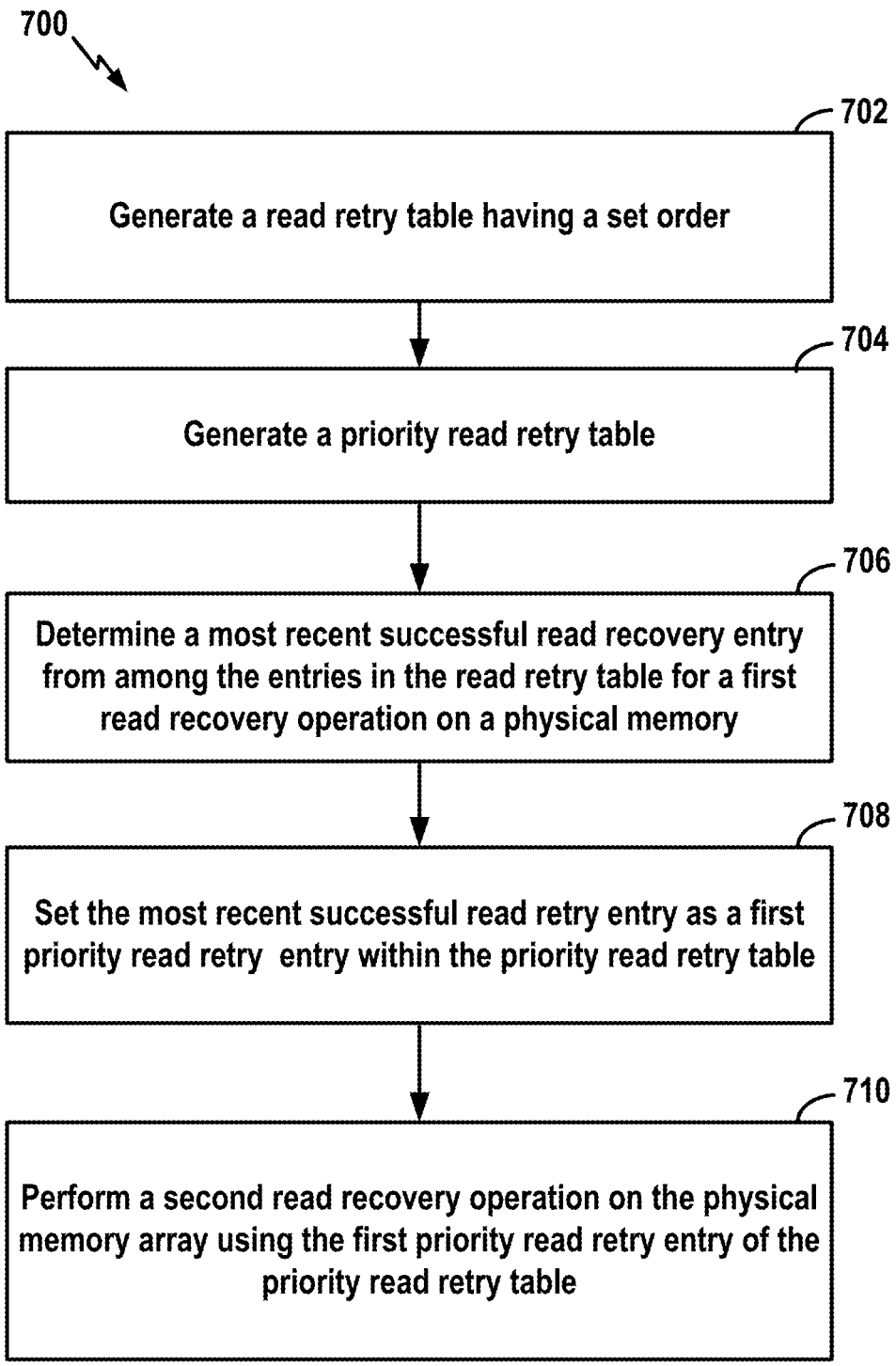
FIG. 7 illustrates flow chart of another exemplary method according to aspects of the present disclosure.

FIG. 7 illustrates a process 700 in accordance with some aspects of the disclosure. The process 700 may take place within an apparatus such as a processor or processing circuit (e.g., the processor 228 of FIG. 2), which may be located in an SSD controller or other suitable apparatus. However, in various aspects within the scope of the disclosure, the process 700 may be implemented by any suitable apparatus or device capable of performing the operations. At block 702, an apparatus (e.g., a controller of an SSD) generates a read retry table having a set order, such as table 306 of FIG. 3A. At block 704, the apparatus generates a priority read retry table. An exemplary priority read retry table is shown in FIG. 3B as table 310. At block 706, the apparatus determines a most recent successful read retry entry from among the entries in the read retry table for a first (or initial) read recovery operation on (or within) a physical memory array, such as a NAND array. At block 708, the apparatus sets the most recent successful read retry entry as a first priority read retry entry within the priority read retry table. Again see, for example, table 310 of FIG. 3B. At block 710, the apparatus performs a second (or subsequent or additional) read recovery operation on (or within) the physical memory array using the first priority read retry entry of the priority read retry table.

Example Apparatus

Figure 8:
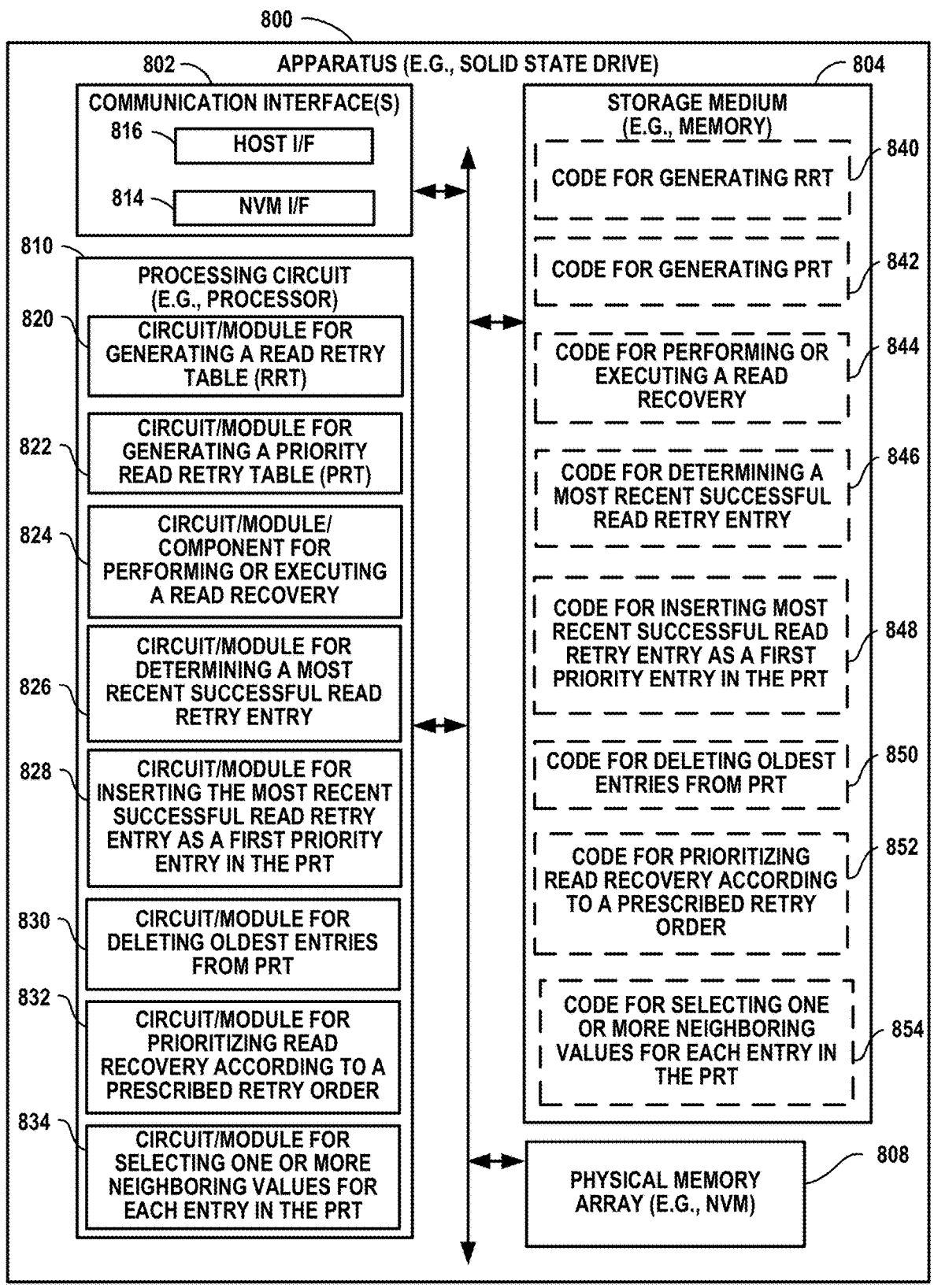
FIG. 8 illustrates a schematic block diagram configuration for an exemplary SSD having one or more NVM arrays.

FIG. 8 illustrates an embodiment of an apparatus 800 configured according to one or more aspects of the disclosure. The apparatus 800, or components thereof, could embody or be implemented within an SSD controller, a host device, an NVM device, a NAND die, or some other type of device that supports data storage. In various implementations, the apparatus 800, or components thereof, could embody or be implemented within a computing device, a personal computer, a portable device, or workstation, a server, a personal digital assistant, a digital camera, a digital phone, an entertainment device, a medical device, or any other electronic device that stores data.

The apparatus 800 includes a communication interface 802, a storage medium 804, a physical memory array (e.g., an NVM memory circuit) 808, and a processing circuit 810 (e.g., at least one processor and/or other suitable circuitry). These components can be coupled to and/or placed in electrical communication with one another via a signaling bus or other suitable component, represented generally by the connection lines in FIG. 8. The signaling bus may include any number of interconnecting buses and bridges depending on the specific application of the processing circuit 810 and the overall design constraints. The signaling bus links together various circuits such that each of the communication interface 802, the storage medium 804, and the memory array 808 are coupled to and/or in electrical communication with the processing circuit 810. The signaling bus may also link various other circuits (not shown) such as timing sources, peripherals, voltage regulators, and power management circuits, which are well known in the art, and therefore, will not be described any further.

The communication interface 802 provides a means for communicating with other apparatuses over a transmission medium. In some implementations, the communication interface 802 includes circuitry and/or programming (e.g., a program) adapted to facilitate the communication of information bi-directionally with respect to one or more devices in a system. In some implementations, the communication interface 802 may be configured for wire-based communication. For example, the communication interface 802 could be a bus interface, a send/receive interface, or some other type of signal interface including drivers, buffers, or other circuitry for outputting and/or obtaining signals (e.g., outputting signal from and/or receiving signals into an integrated circuit). The communication interface 802 serves as one example of a means for receiving and/or a means for transmitting.

The memory array 808 may represent one or more memory devices. In some implementations, the memory array 808 and the storage medium 804 are implemented as a common memory component. The memory array 808 may be used for storing data that is manipulated by the processing circuit 810 or some other component of the apparatus 800.

The storage medium 804 may represent one or more computer-readable, machine-readable, and/or processor-readable devices for storing programming, such as processor executable code or instructions (e.g., software, firmware), electronic data, databases, or other digital information. The storage medium 804 may also be used for storing data that is manipulated by the processing circuit 810 when executing programming. The storage medium 804 may be any available media that can be accessed by a general purpose or special purpose processor, including portable or fixed storage devices, optical storage devices, and various other mediums capable of storing, containing or carrying programming.

By way of example and not limitation, the storage medium 804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 804 may be embodied in an article of manufacture (e.g., a computer program product). By way of example, a computer program product may include a computer-readable medium in packaging materials. In view of the above, in some implementations, the storage medium 804 may be a non-transitory (e.g., tangible) storage medium. For example, the storage medium 804 may be a non-transitory computer-readable medium storing computer-executable code, including code to perform operations as described herein.

The storage medium 804 may be coupled to the processing circuit 810 such that the processing circuit 810 can read information from, and write information to, the storage medium 804. That is, the storage medium 804 can be coupled to the processing circuit 810 so that the storage medium 804 is at least accessible by the processing circuit 810, including examples where at least one storage medium is integral to the processing circuit 810 and/or examples where at least one storage medium is separate from the processing circuit 810 (e.g., resident in the apparatus 800, external to the apparatus 800, distributed across multiple entities, etc.).

Programming stored by the storage medium 804, when executed by the processing circuit 810, causes the processing circuit 810 to perform one or more of the various functions and/or process operations described herein. For example, the storage medium 804 may include operations configured for regulating operations at one or more hardware blocks of the processing circuit 810, as well as to utilize the communication interface 802 for wireless communication utilizing their respective communication protocols.

The processing circuit 810 is generally adapted for processing, including the execution of such programming stored on the storage medium 804. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 810 is arranged to obtain, process and/or send data, control data access and storage, issue commands, and control other desired operations. The processing circuit 810 may include circuitry configured to implement desired programming provided by appropriate media in at least one example. For example, the processing circuit 810 may be implemented as one or more processors, one or more controllers, and/or other structure configured to execute executable programming. Examples of the processing circuit 810 may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 810 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 810 are for illustration and other suitable configurations within the scope of the disclosure are also contemplated.

According to one or more aspects of the disclosure, the processing circuit 810 may be adapted to perform any or all of the features, processes, functions, operations and/or routines for any or all of the apparatuses described herein. For example, the processing circuit 810 may be configured to perform any of the steps, functions, and/or processes described with respect to FIGS. 1-7. As used herein, the term "adapted" in relation to the processing circuit 810 may refer to the processing circuit 810 being one or more of configured, employed, implemented, and/or programmed to perform a particular process, function, operation and/or routine according to various features described herein. The processing circuit 810 may be a specialized processor, such as an ASIC that serves as a means for (e.g., structure for) carrying out any one of the operations described in conjunction with FIGS. 1-7. The processing circuit 810 serves as one example of a means for sending and/or a means for receiving. In various implementations, the processing circuit 810 may provide and/or incorporate, at least in part, the functionality described above for the controller 108 of FIG. 1.

According to at least one example of the apparatus 800, the processing circuit 810 may include one or more of: a circuit/module 820 configured to generate a read retry table (RRT) with a set order; a circuit/module 822 configured to generate a priority read retry table (PRT); a circuit/module or other component 824 configured to perform or execute a read recovery operation or procedure within the physical memory array using entries in a read retry table, wherein the read recovery component is configured to use the first priority entry within the priority read retry table as a first candidate read retry entry during the read recovery operation; a circuit/module 826 configured to determine a most recent successful read retry entry from among the entries in the read retry table; a circuit/module 828 configured to insert the most recent successful read retry entry as a first priority entry in the PRT for use during a subsequent read recovery operation and to repeatedly insert the most recent successful read retry entry as a new first priority entry in the priority read retry table for each successful read recovery; a circuit/module 830 configured to delete the oldest entries from the PRT when the addition of a newest successful read retry entry causes the set size of the priority read retry table to be exceeded; a circuit/module 832 configured to prioritize read recovery according to a prescribed or predetermined retry order, which may include, selecting, during read recovery operations, the read retry entries to be tried for each read recovery operation according to a prescribed priority order until a successful read recovery is achieved, including initially selecting entries in the PRT for use in read recovery operations starting with the newest entry and proceeding chronologically to the oldest entry; and a circuit/module 834 configured to select one or more neighboring values for each entry in the PRT starting with the newest entry and proceeding chronologically to the oldest entry.

As mentioned above, a program stored by the storage medium 804, when executed by the processing circuit 810, causes the processing circuit 810 to perform one or more of the various functions and/or process operations described herein. For example, the program may cause the processing circuit 810 to perform the various functions, steps, and/or processes described herein with respect to FIGS. 1-7 in various implementations. As shown in FIG. 8, the storage medium 804 may include one or more of: code 840 for generate a RRT with a set order; code 842 for generating a PRT; code 844 for performing or executing a read recovery operation or procedure within the physical memory array using entries in a read retry table, wherein the read recovery component is for use the first priority entry within the priority read retry table as a first candidate read retry entry during the read recovery operation; code 846 for determining a most recent successful read retry entry from among the entries in the read retry table; code 848 for inserting the most recent successful read retry entry as a first priority entry in the PRT for use during a subsequent read recovery operation and to repeatedly insert the most recent successful read retry entry as a new first priority entry in the priority read retry table for each successful read recovery; code 850 for deleting the oldest entries from the PRT when the addition of a newest successful read retry entry causes the set size of the priority read retry table to be exceeded; code 852 for prioritizing read recovery according to a prescribed or predetermined retry order, which may include, selecting, during read recovery operations, the read retry entries to be tried for each read recovery operation according to a prescribed priority order until a successful read recovery is achieved, including initially selecting entries in the PRT for use in read recovery operations starting with the newest entry and proceeding chronologically to the oldest entry; and code 854 for selecting one or more neighboring values for each entry in the PRT starting with the newest entry and proceeding chronologically to the oldest entry.

In at least some examples, means may be provided for performing the functions illustrated in FIG. 8 and/or other functions illustrated or described herein. For example, the means may include one or more of: means, such as circuit/module 820, for generating a read RRT with a set order; means, such as circuit/module 822, for generating a PRT; means, such as circuit/module/component 824, for performing or executing a read recovery operation or procedure within the physical memory array using entries in a read retry table, wherein the read recovery component is configured to use the first priority entry within the priority read retry table as a first candidate read retry entry during the read recovery operation; means, such as circuit/module 826, for determining a most recent successful read retry entry from among the entries in the read retry table; means, such as circuit/module 828, for inserting the most recent successful read retry entry as a first priority entry in the PRT for use during a subsequent read recovery operation and to repeatedly insert the most recent successful read retry entry as a new first priority entry in the priority read retry table for each successful read recovery; means, such as circuit/module 830, for deleting the oldest entries from the PRT when the addition of a newest successful read retry entry causes the set size of the priority read retry table to be exceeded; means, such as circuit/module 832, for prioritizing read recovery according to a prescribed or predetermined retry order, which may include, selecting, during read recovery operations, the read retry entries to be tried for each read recovery operation according to a prescribed priority order until a successful read recovery is achieved, including initially selecting entries in the PRT for use in read recovery operations starting with the newest entry and proceeding chronologically to the oldest entry; and means, such as circuit/module 834, for selecting one or more neighboring values for each entry in the PRT starting with the newest entry and proceeding chronologically to the oldest entry.

In other examples, the means may include one or more of: means, such as circuit/module 822, for generating a priority read retry table of read retry entries based on read retry entries obtained from a separate read retry table; means, such as circuit/module 826, for determining a most recent successful read retry entry from the separate read retry table; means, such as circuit/module 828, for populating the priority read retry table by inserting an entry from the read retry table into the priority read retry table, wherein the entry corresponds to the most recent successful read recovery and is inserted as a first priority entry in the priority read retry table; means, such as circuit/module 824, for executing a read recovery procedure within the physical memory array while using the first entry within the priority read retry table as a first candidate entry during the read recovery procedure; means, such as circuit/module 832, for selecting candidate read retry entries for the read recovery procedure according to a prescribed priority order until a successful read recovery is achieved; means, also such as circuit/module 828, for selecting entries from the priority read retry table for the read recovery procedure starting with a newest entry and proceeding to an oldest entry in the priority read retry table; means such as circuit/module 834, for selecting one or more neighboring values for each entry in the priority read retry table for the read recovery procedure starting with the newest entry and proceeding to the oldest entry in the priority read retry table; and means, such as controller 108, for selecting entries in the read retry table for the read recovery procedure according to the set order.

Additional Aspects

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. An apparatus, comprising:
   a physical memory array; and
   a processor configured to perform a read recovery operation within the physical memory array using entries in a read retry table of set order, determine a most recent successful read retry entry from among the entries in the read retry table, generate a separate priority read retry table, and insert the most recent successful read retry entry as a first priority entry in the priority read retry table for use during a subsequent read recovery operation.

2. The apparatus of claim 1, further comprising a read recovery component configured to perform the read recovery operation within the physical memory array, wherein the read recovery component is configured to use the first priority entry within the priority read retry table as a first candidate read retry entry during the read recovery operation.

3. The apparatus of claim 1, wherein the processor is further configured to repeatedly insert the most recent successful read retry entry as a new first priority entry in the priority read retry table for each successful read recovery.

4. The apparatus of claim 3, wherein the priority read retry table is configured by the processor with a set size of a number of entries; and wherein the processor is further configured to delete an oldest successful read retry entry from the priority read retry table if addition of a newest successful read retry entry causes the set size of the priority read retry table to be exceeded.

5. The apparatus of claim 1, wherein the processor is further configured to select, during read recovery operations, the read retry entries to be tried for each read recovery operation according to a prescribed priority order until a successful read recovery is achieved.

6. The apparatus of claim 5, wherein the processor is further configured to select entries in the priority read retry table for use in read recovery operations starting with the newest successful entry and proceeding chronologically to an oldest successful entry.

7. The apparatus of claim 6, wherein the processor is further configured to select one or more neighboring values for each entry in the priority read retry table starting with the newest successful entry and proceeding chronologically to the oldest successful entry.

8. The apparatus of claim 7, wherein the processor is further configured to select entries from the read retry table according to the set order of the read retry table.

9. The apparatus of claim 1, wherein the processor is one or more of a non-volatile memory (NVM) controller, a solid state device (SSD) controller, and a host device processor.

10. A method for use with a physical memory array, the method comprising:

generating a read retry table having a set order;

generating a separate priority read retry table;

determining a most recent successful read retry entry from among the entries in the read retry table for a first read recovery operation on the physical memory array;

setting the most recent successful read retry entry as a first priority read retry entry within the priority read retry table; and performing a second read recovery operation on the physical memory array using the first priority read retry entry of the priority read retry table.

11. The method of claim 10, wherein the setting the most recent successful read retry entry as the first priority read retry entry within the priority read retry table is repeated for each successful read retry entry.

12. The method of claim 11, wherein the priority read retry table has a maximum number of entries, and wherein the method further comprises deleting an oldest successful read retry entry from the priority read retry table if addition of a newest successful read retry entry causes the maximum number of entries to be exceeded.

13. The method of claim 10, further comprising:

during the read recovery operation within the physical memory array, choosing read retry entries to be tried for additional read recovery operations according to a predetermined priority order until a successful read recovery is achieved.

14. The method of claim 13, wherein the predetermined priority order comprises:

(1) selecting entries in the priority read retry table starting with a newest successful entry and proceeding chronologically to an oldest successful entry in the priority read retry table;

(2) then selecting one or more neighboring values for each entry in the priority read retry table starting with the newest successful entry and proceeding chronologically to the oldest successful entry in the priority read retry table; and (3) then selecting entries in the read retry table according to the set order.

15. The method of claim 10, performed by one or more of an non-volatile memory (NVM) controller, a solid state device (SSD) controller, and a host device.

16. An apparatus, comprising:

means for generating a priority read retry table of read retry entries based on read retry entries obtained from a separate read retry table of set order;

means for determining a most recent successful read retry entry from the separate read retry table; and means for populating the priority read retry table by inserting an entry from the read retry table into the priority read retry table, wherein the entry corresponds to the most recent successful read retry entry and is inserted as a first priority entry in the priority read retry table.

17. The apparatus of claim 16, further comprising means for executing a read recovery procedure within the physical memory array while using the first entry within the priority read retry table as a first candidate entry during the read recovery procedure.

18. The apparatus of claim 17, further comprising:

means for selecting candidate read retry entries for the read recovery procedure according to a prescribed priority order until a successful read recovery is achieved.

19. The apparatus of claim 18, further comprising:

means for selecting entries from the priority read retry table for the read recovery procedure starting with a newest entry and proceeding to an oldest entry in the priority read retry table;

means for selecting one or more neighboring values for each entry in the priority read retry table for the read recovery procedure starting with the newest entry and proceeding to the oldest entry in the priority read retry table; and means for selecting entries in the read retry table for the read recovery procedure according to the set order.

20. The apparatus of claim 16, wherein the apparatus is one or more of an non-volatile memory (NVM) controller, a solid state device (SSD) controller, and a host device.

* * * * *